Figure 1:
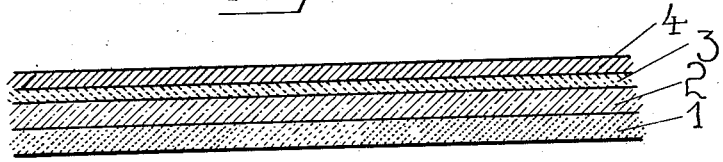

April 21, 1931. L. RADO 1,802,066

MATERIAL FACING FOR EMBELLISHING ARTICLES

Filed Sept. 27, 1927

Inventor
Leopold Rado
By
a. B. Foster
His Attorney

Patented Apr. 21, 1931

1,802,066

UNITED STATES PATENT OFFICE

LEOPOLD RADO, OF BERLIN-HALENSEE, GERMANY

MATERIAL FACING FOR EMBELLISHING ARTICLES

Application filed September 27, 1927, Serial No. 222,400, and in Germany May 24, 1927.

A whole series of different articles have hitherto been embellished with metal foil. It is known for example to coat cardboard, paper, cartons of all kinds, etc. with thin metal foil such for example as aluminium foil or with aluminium foil coated with paper.

The articles embellished with hitherto known coatings of thin metal foil or with metal foil coated with paper have suffered from great disadvantages. Since the thin metal foil has a very low tensile strength, great difficulties arise when this is used for coating purposes, particularly in working the coated articles. When coated articles of paper, paste-board and the like are worked, that is to say by subjecting them to bending, drawing, pressing, folding, grooving, etc., they very readily break and spring and the metal foil readily rubs off. In working coated materials in lengths, in particular those of elastic substances, such for example as fabric, leather, rubber, etc., when the elastic material is stretched the metal foil cannot stretch with it and consequently upon bending, folding, etc. it tears or springs and comes away from the material track.

It has been discovered that cellulose hydrate foils are particularly suitable for increasing the tensile strength of the metal foil under cellulose hydrate foils are understood the cellulose foils known in commerce and mostly produced from viscose (also cellulose glass skin, cellulose skin or named for short cellulose) as well as all like products which are produced from the various cellulose derivatives, with or without the addition of a softening medium in the form of foils, skins, films or the like. The exceptional advantages which the cellulose hydrate foil gives obviously lie therein that it can be produced of a thickness of 0.01 mm. and in spite of this possesses very great tensile strength. It is not friable, performs all movements together with the base and allows itself to be united without any difficulties to the metal foil with the aid of the usual adhesives. Apart from this the cellulose hydrate foil is glass clear, and completely odourless. If a metal foil is coated with cellulose hydrate foil with the aid of suitable adhesive it is capable of withstanding all strains without the metal foil breaking, springing or cracking.

By uniting the metal foil securely with the cellulose hydrate foil a composite film of material is obtained having quite new properties. The mechanical strength and power to withstand strain of this film of material is considerably greater than the sum of the mechanical properties of the two individual films in contra-distinction to the simple lacquering of metal foil which has practically no effect upon the tensile strength and power of resistance to mechanical strain or only affects this to a very small extent.

The principal feature of the invention consists in that flat articles such as paper, pasteboard and the like fibrous materials and also finished cartons of all kinds made out of such materials, particularly those of elastic substance such as fabric, leather, rubber, or the like, are coated first of all with metal foil such as aluminium foil, or with metal foil carried upon a base (for example paper), whereupon the metallized articles are provided, by means of suitable adhesive, with a coating of cellulose hydrate foil coated on at least one side with a transparent water insoluble substance.

With elastic material such as leather, fabric, rubber, and the like in the fabric, an elastic adhesive such as india-rubber solution, guttapercha or the like is used or a sheet of paper is interposed between the metal foil and the sheet of flexible material. For applying the transparent coating a suitable transparent adhesive is preferably used. The sequence in which the individual films are applied to the articles to be embellished is governed by the materials to be used and the working conditions existing.

It has been found that an effect which is sufficient for many purposes can be obtained if elastic material lengths of fabric, leather, rubber, cellulose, viscose or the like are simply provided with metal backed paper, that is without further transparent coating.

It is known that cellulose hydrate foils are very hygroscopic and absorb the slightest moisture. According to the invention this disadvantage is overcome by making this material waterproof or washable in order to avoid its hygroscopic character. This is preferably done by providing the transparent flat coating, upon one or both sides, with a transparent film of, for example, celluloid solution, lacquer or the like, for example, by applying these solutions in a liquid condition. These celluloid films or the like must be applied so that the whole surface of the cellulose hydrate foil is covered with them. The waterproofing of the cellulose hydrate foil may be carried out before or after its application to the articles.

The transparent coating of strong material which is securely attached to the metal foil gives the articles an enamel-like gloss and provides reliable protection of the metallic surface against mechanical injury.

It is quite possible by suitable choice of the base material and by corresponding choice of the individual coatings, to give the final product whatever mechanical properties may be desired. Moreover by choice of the colour of the base material and also that of the individual coatings any desired colour effect may be included. Both the metal foil and also the individual transparent coatings may in desired manner, be dyed, printed, sprayed, painted, or provided with a light-sensitive film to permit the application of photographs thereto.

Figure 2:
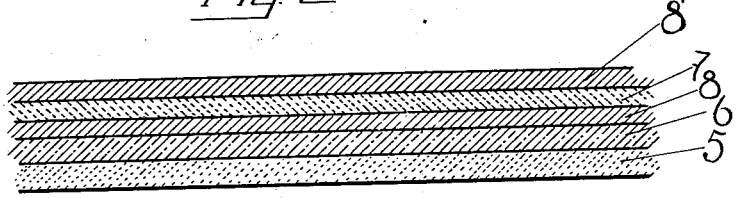
Figure 3:
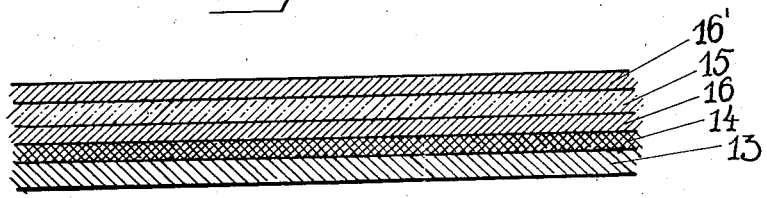

In the accompanying drawing Figures 1 to 3 are enlarged cross sections illustrating some principal embodiments of the described composite sheet according to the invention.

In Figure 1 the article 1 is overlaid with a metal foil 2 provided with a foil 3 of cellulose hydrate coated with a transparent water insoluble substance 4.

In Figure 2 the composite sheet consists of the flat article 5 supporting the metal foil 6 provided with a cellulose hydrate foil 7 coated on both sides with transparent waterproof substances 8, 8'.

In Figure 3 the flat article 13 of elastic substance is overlaid with the sheet of paper 14 which is the base of the metal foil 15 coated on both sides with transparent waterproof substances 16, 16'.

In general, from the point of view of the base material, there are the following applications and advantages:

For paper, paste-board and like materials as base the principal applications lie in the carton industry. With thin paper or the like, embellished in accordance with the invention, finished cartons, bookbindings, placards and the like may be coated or may be made of the coated material. If strong paste-board is used as the base material it is possible by drawing, pressing or stamping to make boxes, cases containers and the like.

Since the metal coating is protected by the strong coating from injury and rubbing off by the tools during working, the final product which is obtained is of quite perfect quality. Also even with complicated mouldings, stampings and the like the material retains its enamel-like gloss and the moulding is quite sharply and cleanly reproduced without any cracks being visible in the metal film even at the sharpest edges. The different articles may naturally be coated upon one or both sides or they may be made out of material which is coated upon one or both sides. Owing to the possibility of stamping, and if desired dying the material or providing it with inscriptions and pictorial representations all subsequent lacquering, labelling and the like is avoided. When thin base material is used it is suitable in particular for the packing of objects in which reliable protection against external influences is necessary. Small bags and folding cases may also be made out of similar material. This material may further be used for covering in the most varied manner useful objects of all kinds such as wall papers and furniture.

Articles made out of piece goods such as fabric, leather, rubber and the like have quite new properties and applications. They may be handled in an exactly similar manner to piece goods of the usual kind such as by folding, stitching by machine or by hand etc. These new materials may also be used in the manufacture of articles of clothing, mantles, umbrellas, hand bags for overlays and insertions etc.

The following articles may be produced: hand bags, pocket books and similar pocket articles of either fabric, leather or the like, belts, shoe heels, luxury shoes, bookbindings, in particular book backs, portfolios, table cloths, etc.

Also in the graphic industry brushed, carded or grained metal foil may be used for the printing plates of printing machines or for duplicating apparatus, the metal foil being backed with paper and applied in accordance with the invention to lengths of woven material or the like.

The individual insulating metal coatings may of course be combined in any desired manner with other film coatings.

The invention is also applicable to the manufacture of cords. For this purpose metal foil is applied for example to cellulose paper, which as is known is tough, and a transparent film is applied thereover. The connected films are then cut into narrow strips and these strips are rolled as paper cords. The metal foil may also be connected with two transparent films, for example of cellulose, and then cut into small strips and rolled. Such twisted cords have the appearance of metal cords or threads and may be twisted or woven, etc.

I claim:

1. Material facing containing metal foil as one constituent, characterized by the fact that it consists of a flexible sheet capable of giving tensile strength to the whole, a metal foil joined thereto by an adhesive, a cellulose hydrate foil covering the metal foil, said cellulose hydrate foil being coated on at least one side with a transparent water insoluble substance.

2. Material facing as in claim 1 characterized by the fact that a sheet of paper is interposed between said metal foil and said sheet of flexible material.

3. Material facing as in claim 1 characterized by the fact that a surface is given a variegated effect by impressing designs upon the same.

In testimony whereof I have signed my name to this specification.

LEOPOLD RADO.